(12) United States Patent
Krause et al.

(10) Patent No.: US 9,527,040 B2
(45) Date of Patent: Dec. 27, 2016

(54) PROCESS FOR CONTINUOUSLY WASHING A HOLLOW FIBER MEMBRANE FOR DEPLETING RESIDUALS

(71) Applicant: GAMBRO LUNDIA AB, Lund (SE)

(72) Inventors: Bernd Krause, Rangendingen (DE); Carina Zweigart, Schoemberg (DE); Christof Beck, Bitz (DE); Bernd Hertzler, Balingen (DE); Steffen Wagner, Messstetten (DE); Joachim Loercher, Moessingen (DE)

(73) Assignee: GAMBRO LUNDIA AB, Lund (SE)

( * ) Notice: Subject to any disclaimer, the term of this patent is extended or adjusted under 35 U.S.C. 154(b) by 282 days.

(21) Appl. No.: 14/352,001

(22) PCT Filed: Oct. 18, 2012

(86) PCT No.: PCT/EP2012/070604
§ 371 (c)(1),
(2) Date: Apr. 15, 2014

(87) PCT Pub. No.: WO2013/057161
PCT Pub. Date: Apr. 25, 2013

(65) Prior Publication Data
US 2014/0251377 A1  Sep. 11, 2014

(30) Foreign Application Priority Data
Oct. 20, 2011  (EP) .................... 11185890

(51) Int. Cl.
*B01D 65/02* (2006.01)
*B01D 67/00* (2006.01)
*B01D 69/08* (2006.01)

(52) U.S. Cl.
CPC ............ *B01D 65/02* (2013.01); *B01D 67/003* (2013.01); *B01D 67/0088* (2013.01);
(Continued)

(58) Field of Classification Search
CPC ................... B01D 2321/00; B01D 2321/2066; B01D 2321/2075; B01D 2321/26; B01D 2321/30; B01D 2323/42; B01D 65/02; B01D 67/003; B01D 67/0088; B01D 69/087
See application file for complete search history.

(56) References Cited

U.S. PATENT DOCUMENTS

| 4,507,913 A | 4/1985 | Morrison |
| 5,213,689 A | 5/1993 | Kafchinski et al. |

(Continued)

FOREIGN PATENT DOCUMENTS

| CN | 101961609 | 2/2011 |
| JP | 2008-114181 | 5/2008 |

(Continued)

OTHER PUBLICATIONS

PCT Search Report and Written Opinion for PCT/EP2012/070604, completed Jan. 14, 2013.

*Primary Examiner* — John Kim
(74) *Attorney, Agent, or Firm* — Barnes & Thornburg LLP

(57) ABSTRACT

Continuous processes for depleting residuals in hollow fiber membranes comprising polysulfone or polyethersulfone and polyvinylpyrrolidone by rinsing the membranes while compressing them in a pinching device comprising grooved rollers.

19 Claims, 4 Drawing Sheets

(52) U.S. Cl.
CPC ........ *B01D 69/087* (2013.01); *B01D 2321/00* (2013.01); *B01D 2321/2066* (2013.01); *B01D 2321/2075* (2013.01); *B01D 2321/26* (2013.01); *B01D 2321/30* (2013.01); *B01D 2323/42* (2013.01)

(56) References Cited

U.S. PATENT DOCUMENTS

| | | | | |
|---|---|---|---|---|
| 2009/0220612 | A1* | 9/2009 | Perera | A61K 9/16 424/497 |
| 2011/0290709 | A1* | 12/2011 | Ohno | B01D 63/02 210/321.8 |
| 2012/0103895 | A1* | 5/2012 | Tada | B01D 67/002 210/500.42 |

FOREIGN PATENT DOCUMENTS

| | | |
|---|---|---|
| JP | 2008-161755 | 7/2008 |
| WO | WO2010/090174 | 8/2010 |

\* cited by examiner

PROCESS FOR CONTINUOUSLY WASHING A HOLLOW FIBER MEMBRANE FOR DEPLETING RESIDUALS

CROSS-REFERENCE TO RELATED APPLICATIONS

This application is the U. S. national phase of PCT/EP2012/070604, filed Oct. 18, 2012. PCT/EP2012/070604 claims priority under the Convention to EP 11 18 58 90.8, filed Oct. 20, 2011. The entire disclosures of both PCT/EP2012/070604 and EP 11 18 58 90.8 are hereby incorporated herein by reference.

TECHNICAL FIELD

The present disclosure relates to continuous processes for depleting residuals in hollow fiber membranes comprising polysulfone or polyethersulfone and polyvinylpyrrolidone.

DESCRIPTION OF THE RELATED ART

Diffusion and/or filtration devices comprising hollow fiber membranes are used in various medical treatments which remove unwanted substances from body fluids, e.g., blood. As the hollow fiber membranes in these devices are in contact with the patient's blood during treatment, it is important that they have a low content of residuals which are extractable by blood.

Typically, residuals are removed during the production process of the hollow fiber membranes by conducting the freshly spun fibers through a sequence of water baths. Residual solvent and extractable fractions of hydrophilic polymers like polyvinylpyrrolidone are washed out of the membranes by this procedure.

The installation space required for the sequence of water baths is relatively large; and they consume substantial amounts of water and energy. It would therefore be desirable to have alternative, more efficient processes.

SUMMARY

Alternative processes for removing residuals from hollow fiber membranes comprising polysulfone or polyethersulfone and polyvinylpyrrolidone have been developed. The processes increase convective transport of a washing fluid through the membrane wall by miscellaneous devices to enhance removal of residuals. The processes of the invention require less space than conventional water baths and help to save water and energy.

DETAILED DESCRIPTION

The present invention provides continuous processes for removing residuals from hollow fiber membranes comprising polysulfone or polyethersulfone and polyvinylpyrrolidone which involve enforced convective transport of a washing fluid through the membrane wall.

In one embodiment of the process, a pressure gradient is established between the outside and the lumen of the membrave to increase convective transport of washing fluid through the membrane wall.

In one embodiment of the process, the hollow fiber membranes are guided through at least one pressurized washing chamber. A washing fluid is simultaneously pumped into the chamber under pressure in counter-current or cross flow. Examples of suitable washing fluids include water, steam, ethanol, and aqueous hydrogen peroxide. In one embodiment, the washing fluid has a temperature in the range of 15 to 100° C., for instance, 40 to 90° C.

Figure 1:
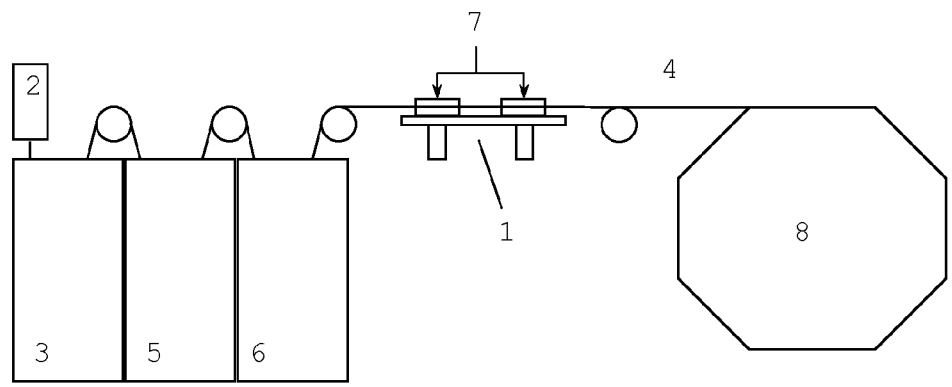
FIG. 1 shows a schematic view of one arrangement for washing a hollow fiber membrane with a pressureized washing chamber.

A schematic view of one possible arrangement is shown in FIG. 1. A polymer solution is extruded through an outer ring slit of a nozzle and falls through a spinning shaft 2 into a precipitation bath 3. The hollow fiber membrane 4 obtained is then conducted through a first washing bath 5, a second washing bath 6, and a pressurized fluid chamber 1, to a spinning wheel 8. Water 7 is pumped directly into the pressurized fluid chamber 1.

In one embodiment, the at least one pressurized washing chamber is circular, having two opposing slots as entrance and exit for the hollow fiber membranes. In another embodiment, the at least one pressurized washing chamber is rectangular.

In one embodiment, the number of pressurized washing chambers is in the range of 1 to 10, for instance, 2 to 5. In one embodiment of the invention, the number of pressurized washing chambers is 2.

The slots can have the same or different dimensions. In one embodiment, the slots have at their narrowest point a depth and a width in the range of 0.2 to 1 mm, for instance, 0.3 to 0.5 mm.

In one embodiment, a desired dimension of the slots is generated by positioning an insert into a bigger groove. In one embodiment, the slot on the insert has a smaller length than the slot on the pressurized washing chamber.

Figure 2:
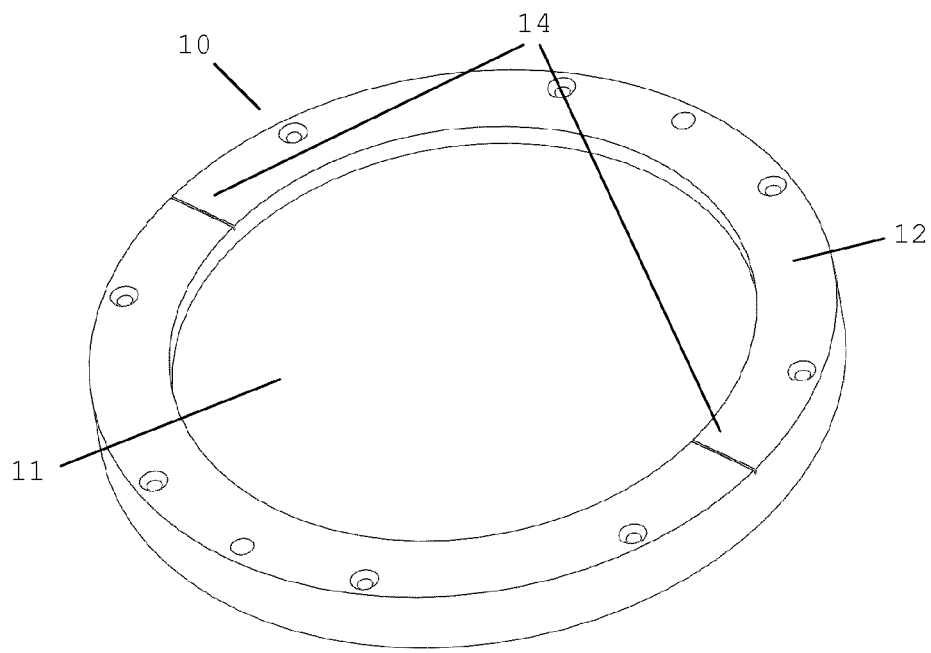
FIG. 2 shows a bottom part of a pressurized washing chamber as schematically drawn in FIG. 1.
Figure 3:
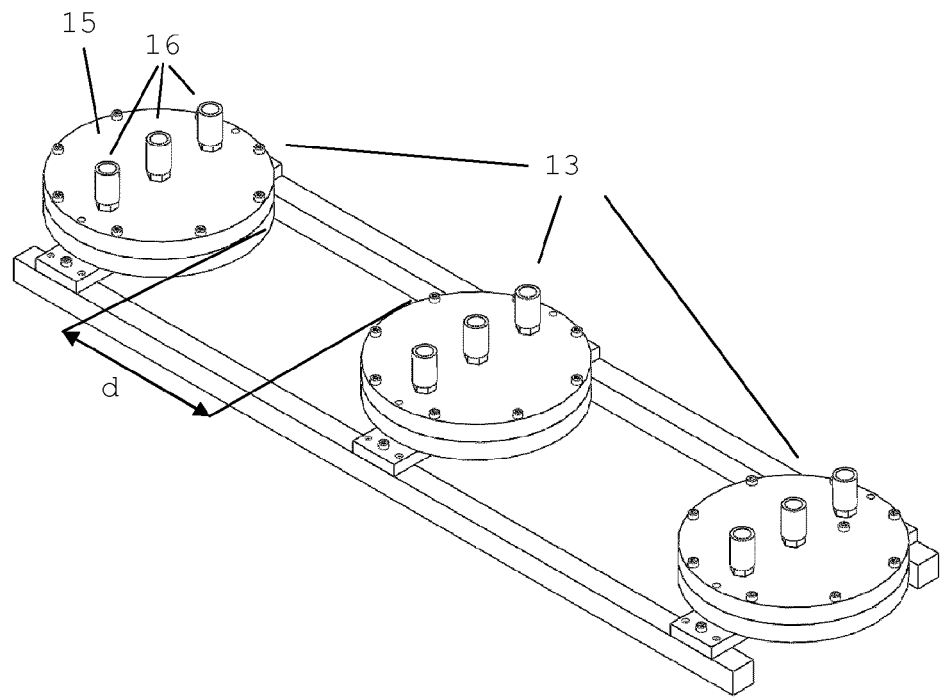
FIG. 3 shows a schematic arrangement of three pressureized washing chambers.

An example of a pressurized washing chamber is shown in FIGS. 2 and 3. FIG. 2 shows a bottom part 10 of a pressurized washing chamber 1 as schematically pictured in FIG. 1. The bottom part 10 comprises an inner part 11 and a border 12 of a certain width, the border bearing connection means for connecting the bottom part 10 with an upper part 13 (shown in FIG. 3). An inlet and an outlet for a hollow fiber membrane are provided in form of two opposing openings or grooves 14 in the border 12 of the bottom part 10.

FIG. 3 shows a schematic arrangement of three pressureized washing chambers 1, wherein the distance d between two chambers is, for instance, 15 cm. The upper part 13 of each chamber 1 is attached to its respective bottom part 10 by means of screws. On an upper surface 15 of the upper part 13, connectors 16 for pressurized water, pressure measurement and temperature measurement, respectively, are provided.

Figure 4:
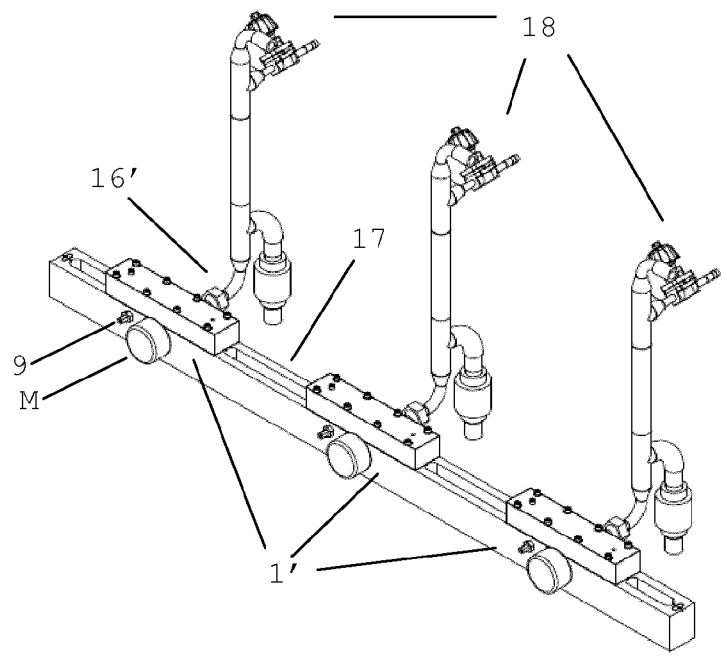
FIG. 4 shows another schematic arrangement of three pressurized washing chambers.

FIG. 4 shows a schematic view of a second arrangement of pressurized washing chambers. The chambers 1' are elongated and connected to each other by a water bath 17 which the membrane passes on the way from one chamber to the next. In contrast to the chamber of FIG. 3, the washing water inlet 16' is not positioned vertically on the upper part of the pressurized chamber, but horizontally on one side of the chamber 1', orthogonally to the spinning direction of the hollow fiber membranes. Further, each chamber 1' is connected to a heat exchanger 18 for regulating the temperature of the washing water and is equipped with a manometer M and a connector 9 for a temperature sensor.

Figure 5:
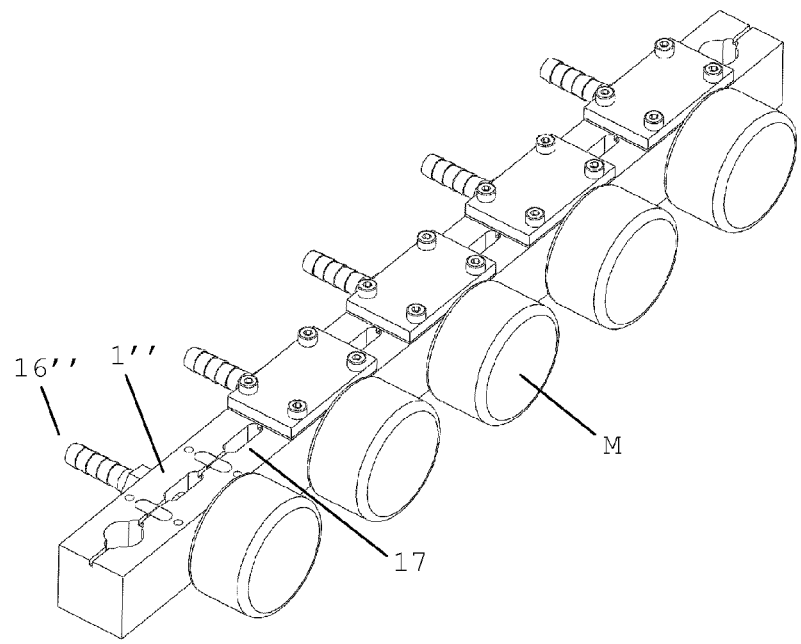
FIG. 5 shows a schematic arrangement of five pressureized washing chambers.

FIG. 5 shows a schematic view of a third arrangement of pressurized washing chambers. The chambers 1" are elongated and connected to each other by a separator, e.g. a water bath 17', which the membrane passes on the way from one chamber to the next. Like in the chambers of FIG. 4, the washing water inlet 16" is positioned horizontally on one side of the chamber 1", orthogonally to the spinning direction of the hollow fiber membranes. In the drawing, the cover of the first pressurized washing chamber has been removed to display the interior of the chamber and the slit diaphragms at the inlet and the outlet of the chamber, respectively, through which the membrane passes. Each chamber is equipped with a manometer M.

In one embodiment, the retention distance, i.e. the distance the membranes cover in the at least one pressurized washing chamber, is in the range of 1 to 100 cm, for instance, 3 to 10 cm, or 20 to 40 cm, or 50 to 80 cm.

In one embodiment, the residence time of the hollow fiber membranes in the at least one pressurized washing chamber is in the range of 0.1 to 10 s, for instance, 0.3 to 4 s.

In one embodiment, the gauge pressure of the washing fluid is in the range of 0.05 to 4 bar, for instance, 1.1 to 2.5 bar, or 0.1 to 0.9 bar.

In one embodiment, the at least one pressurized washing chamber is a counter-current chamber, i.e. the fluid is conducted from the outlet to the inlet of the membranes.

In one embodiment, the hollow fiber membranes are guided through two or more pressurized washing chambers, wherein the pressure of the washing liquid in each pressurized washing chamber is the same or different. For instance, in one pressurized washing chamber an overpressure is applied, in a second pressurized chamber an underpressure.

In one embodiment, the distance between a first and a second pressurized washing chamber is in the range of 1 to 20 cm, for instance, 10 to 15 cm.

In one embodiment, at least one washing bath containing a washing liquid is positioned between two pressurized washing chambers.

In a further embodiment, pressurized washing chambers are combined with an ultrasonic device to support the convectine transport of a washing fluid into the membranes.

In one embodiment, the ultrasonic device comprises a sonotrode.

In one embodiment, the frequency of the ultrasonic device is in the range of 10 kHz to 3 MHz, for instance, 20 to 80 kHz.

In one embodiment, the oscillation amplitude of the sonotrode is in the range of 10 to 150 μm.

In one embodiment, the power of the ultrasonic device is in the range of 200 to 1000 W, for instance, 250 to 500 W.

In one embodiment, the distance of the sonotrode of the ultrasonic device to the hollow fiber membranes is in the range of 1 to 15 mm, for instance, 2 to 9 mm.

Figure 6:
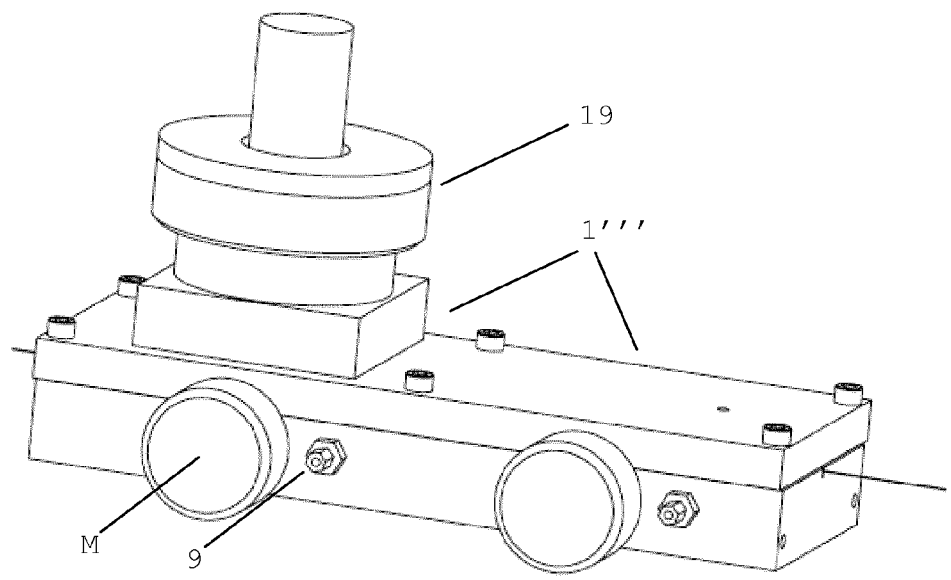
FIG. 6 shows a schematic arrangement of two pressureized washing chambers and an ultrasonic device.

FIG. 6 shows a device which combines pressurized washing chambers with ultrasound. Two flat, rectangular pressurized washing chambers 1''' are positioned adjacent to each other. Each chamber is equipped with a manometer M and a connector 9 for a temperature sensor. In spinning direction, the first chamber 1''' comprises an ultrasonic device comprising a sonotrode 19. The sonotrode 19 is mounted on the respective upper part of the chamber 1''' and extends into the pressurized washing chamber. In order to provide for efficacy, the sonotrode is positioned in close range of the hollow fiber membranes.

In another embodiment of the process, at least one flat-jet nozzle is used to pressure-wash the membrane.

In one embodiment, the flat-jet nozzles have a power in the range of 0.1 to 4 l/min, for instance, 0.3 to 1 l/min, or 2 to 3 l/min.

In one embodiment, the pressure of the fluid sprayed on the membranes is in the range of 1 to 7 bar, for instance, 1 to 3 bar.

In one embodiment, the fluid is sprayed on the membranes while they are on a godet.

In one embodiment, the spraying angle of the flat-jet nozzle is in the range of 20 to 90°, for instance, 30° to 60°.

In one embodiment, the distance of the at least one flat-jet nozzle to the membranes is in the range of 5 to 40 mm, for instance, 10 to 30 mm.

In still another embodiment of the process, the hollow fiber membranes are mechanically compressed to force fluid through the wall of the membranes.

In one embodiment of the invention, the hollow fiber membraves are guided over a roller bearing a groove smaller than the outer diameter of the membranes. The compression of the hollow fiber membranes is, therefore, dependent on the groove width. For example, a hollow fiber membrane having an outer diameter of 315 μm, guided over a roller having a groove of 200 μm width, experiences a mechanical compression of 115 μm.

In one embodiment of the invention, the groove width of the roller is in the range of 0 to 300 μm, for instance, 50 to 200 μm.

In one embodiment of the invention, the hollow fiber membrane is rinsed with water during mechanical compression.

Figure 7:
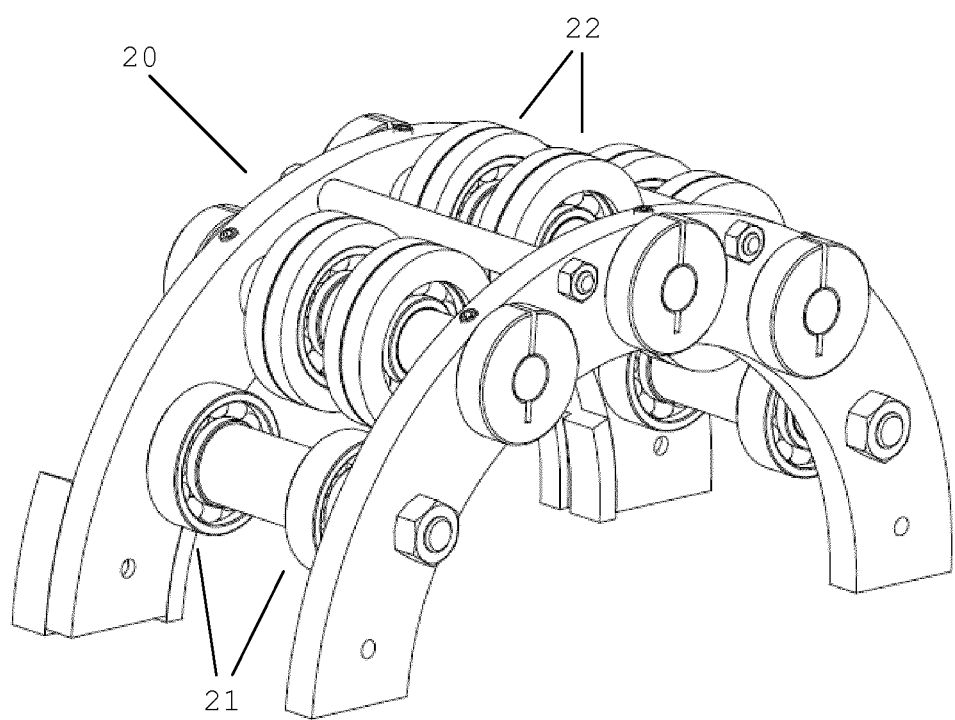
FIG. 7 shows a squeezing/pinching device for carrying out a process according to the present invention.

FIG. 7 shows a squeezing/pinching device 20 according to one embodiment of the invention. The device 20 is arched as it is designed to be placed on a rotating godet (not shown) by supporting rollers 21. The hollow fiber membranes are guided underneath the supporting rollers and underneath rollers 22 bearing grooves smaller than the outer diameter of the membranes, thus leading to a mechanical compression of the membranes. The rollers 22 are exchangeable, so that rollers with different grooves can be easily mounted on the pinching device 20. Additionally, the membranes are washed by a fluid stream, for instance water, during the mechanical compression.

In still another embodiment of the process, a pressure gradient is applied to the hollow fiber membrane to suck washing liquid through the membrane wall.

In one embodiment of the invention, the hollow fiber membranes are guided over a roller having radial slots. The slots are smaller in width than the outer diameter of the hollow fiber membranes. The roller further bears a center chamber having an access to the slots. When underpressure is applied to the center chamber and to the slots, the hollow fiber membrane is sucked into the slots. When water is then poured over the hollow fibers, the vacuum sucks water from the outside through the fibers into the center-chamber, generating a water flow that rinses the fibers.

In one embodiment of the invention, the pressure is in the range of 0.2 to 1 bar, for instance, 0.4 to 0.8 bar.

It will be understood that the features mentioned above and those described hereinafter can be used not only in the combination specified but also in other combinations or on their own, without departing from the scope of the present invention.

The present invention will now be described in more detail in the examples below. It is to be understood that the examples are not intended to limit the scope of the present invention and are merely an illustration of a preferred embodiment of the invention.

EXAMPLES i) Determination of Free PVP and NMP in Hollow Fiber Membranes

In order to determine the amount of free PVP and NMP in the hollow fiber membranes, a bundle of 141 fibers was cut from the spinning wheel and the free PVP and NMP were extracted as follows. The bundle of fibers was immersed in 200 mL of water and kept at 60° C. for 20 h. Then, the concentration of PVP and NMP in the water was determined. PVP was determined as iodine complex by spectrophotometry; NMP was determined by reversed phase high performance liquid chromatography (RP-HPLC) using RP-18 columns as stationary phase and a mixture of 30 wt % acetonitrile and 70 wt % water as eluent; with photometric detection of NMP at 210 nm.

ii) Preparation of Hand Bundles

To prepare membrane bundles for the performance tests, a bundle of 150 hollow fibers is cut to a defined length of 23 cm. The ends of the fibers are closed by melting. An optical control ensures that all fibers are well melted. Then, the ends of the fiber bundle are transferred into a potting cap. The potting cap is fixed mechanically and a potting tube is put over the potting caps. Then the fibers are potted with polyurethane. After the polyurethane has hardened, the potted membrane bundle is cut to open the fibers and stored dry before it is used for the different performance tests.

iii) Hydraulic Permeability (Lp) of Hand Bundles

The hydraulic permeability of a membrane bundle is determined by pressing a defined volume of water under pressure through the membrane bundle, which has been sealed on one side, and measuring the required time. The hydraulic permeability can be calculated from the determined time, the effective membrane surface area, the applied pressure and the volume of water pressed through the membrane. From the number of fibers, the fiber length and the inner diameter of the fiber, the effective membrane surface area is calculated. The membrane bundle has to be wetted thirty minutes before the Lp-test is performed. For this purpose, the membrave bundle is put in a box containing 500 ml of ultrapure water. After 30 minutes, the membrane bundle is transferred into the testing system. The testing system consists of a water bath that is maintained at 37° C. and a device where the membrane bundle can be mounted. The filling height of the water bath has to ensure that the membrane bundle is located underneath the water surface in the designated device. To avoid a leakage of the membrane leading to a wrong test result, an integrity test of the membrane bundle and the test system has to be carried out in advance. The integrity test is performed by pressing air through the membrane bundle that is closed on one side of the bundle. Air bubbles indicate a leakage of the membrane bundle or the test device. It has to be checked if the leakage is due to an incorrect mounting of the membrane bundle in the test device or if a real membrane leakage is present. The membrane bundle has to be discarded if a leakage of the membrane is detected. The pressure applied in the integrity test has to be at least the same value as the pressure applied during the determination of the hydraulic permeability in order to ensure that no leakage can occur during the measurement of the hydraulic permeability because the pressure applied is too high.

Starting Materials

PAES: polyethersulfone Ultrason®E 6020 P, BASF S.E.;

PVP K30: polyvinylpyrrolidone Luvitec® K30, BASF S.E.; $M_n$=14 kDa; $M_w$=50 kDa;

PVP K85: polyvinylpyrrolidone Luvitec® K85, BASF S.E.; $M_n$=250 kDa; $M_w$=1,100 kDa;

PA: polyamide Trogamid® T5000 (Evonik Degussa GmbH, 45764 Marl)

Flat-jet nozzle 650, Düsen-Schlick GmbH, 96253 Untersiemau;

Ultrasonic sonotrode UIP1000hd, Hielscher Ultrasonics GmbH, 14513 Teltow.

Examples 1a and 1b

A High-Flux membrane was prepared by a solvent phase inversion spinning process. Polyethersulfone, polyamide and PVP K30/K85 (see table 1) were dissolved in a water/NMP solvent to form a polymer solution. The polymer solution was then extruded through an outer ring slit of a nozzle with two concentric openings, while a center fluid was extruded through the inner opening of the nozzle. Finally, the membrane obtained was washed. Table 1 summarizes the relevant process parameters.

TABLE 1

Process parameters

| Example | Precipitation bath T ° C. | Precipitation bath NMP % | Polymer PAES % | Polymer PVP K85 % | Polymer PVP K30 % | Polymer PA % | Polymer $H_2O$ % | Polymer NMP % |
|---|---|---|---|---|---|---|---|---|
| 1a | 20 | 0 | 13.55 | 2 | 5 | 0.05 | 3 | 76.4 |
| 1b | 20 | 0 | 13.55 | 2 | 5 | 0.05 | 3 | 76.4 |

| Center $H_2O$ % | Center NMP % | Falling height cm | $v_{ab}$ m/min | Temp. sn ° C. | Temp. ss ° C. | Dimensions id µm | Dimensions wth µm |
|---|---|---|---|---|---|---|---|
| 56 | 44 | 100 | 20 | 54 | 51 | 215 | 50 |
| 56 | 44 | 100 | 45 | 54 | 51 | 215 | 50 |

The hydraulic permeability was then tested on unsterilized and sterilized hand bundles (hb). The results are shown in table 2.

TABLE 2

Lp-values for membranes formed at a spinning speed of 20 and 45 m/min, respectively.

| Membrane | Lp [$10^{-4}$ * cm/(bar * s)] unsterilized hb | Lp [$10^{-4}$ * cm/(bar * s)] sterilized hb |
|---|---|---|
| Example 1a | 49.5 | 54.4 |
| Example 1b | 184 | 168.9 |

Examples 2-13

The hollow fiber membranes of Example 1b formed at a spinning speed of 45 m/min were washed under different conditions, in order to determine the best conditions for eliminating the greatest amount of PVP and NMP.

As a reference, the membrane was washed in one, two or three washings baths (wb), respectively. The distance covered by the membrane in a washing bath was 10 m. Then, the washing process was extended by using from one to three pressurized washing chambers (pc). The washing conditions are summarized in table 3.

The pressurized washing chambers are shown in FIG. 2. They comprise a circular bottom part and a circular upper part (not shown). The upper part is connected to the bottom part by connecting means provided along a border of the bottom and upper part and bears at least one inlet for the pressurized fluid orthogonal to flow direction. In order to permit the membrane to enter and exit the pressurized chamber, the border of the bottom part is provided with two opposing slots extending from an inner side to an outer side of the border of the bottom part. The slots are used as inlet and outlet, respectively, for the membrane. In the chamber used in the experiments, the slots had a width orthogonal to an axis connecting an inside and an outside of the chamber of 0.5 mm. Further, the chamber had an inner diameter of 12.5 cm. When two or three pressurized chambers were used, the distance between the outlet of one chamber and the inlet of a second chamber was 15 cm.

The pressurized chambers were connected to a gear pump (Verdergear VG1000, Verder Deutschland GmbH, 42781 Haan, Germany) that pumped water with a temperature of 85° C.±5° C. into the washing chambers at a desired pressure.

TABLE 3

Washing of hollow fiber membranes

| Example | wb 1 | wb 2 | wb 3 | pc 1 p [bar] | pc 2 p [bar] | pc 3 p [bar] |
|---|---|---|---|---|---|---|
| Ref. 1 | x | x | x | — | — | — |
| Ref. 2 | x | x | — | — | — | — |
| 2 | x | x | — | 1.1 | — | — |
| 3 | x | x | — | 1.1 | 1.1 | — |
| 4 | x | x | — | 1.1 | 1.1 | 1.1 |
| 5 | x | x | — | 0.5 | 0.5 | 0.5 |
| 6 | x | x | — | 2.5 | — | — |
| 7 | x | x | — | 1 | 1.6 | 1.6 |
| 8 | x | x | — | 1 | 2 | 2 |
| Ref. 3 | x | — | — | — | — | — |
| 9 | x | — | — | 1 | — | — |
| 10 | x | — | — | 1 | 1 | — |
| 11 | x | — | — | 1 | 1 | 1 |
| 12 | x | — | — | 0.5 | 1.5 | 1.5 |
| 13 | x | — | — | 1 | 1.5 | 1.5 |

The membranes obtained were then analyzed for their content of free PVP. The results are summarized in table 4.

TABLE 4

Free PVP content in dry fibers after washing

| Example | Ref. 1 | Ref. 2 | 2 | 3 | 4 | 5 | 6 | 7 |
|---|---|---|---|---|---|---|---|---|
| PVP [mg/g] | 2.5 | 3.7 | 2.1 | 1.7 | 2.0 | 2.7 | 1.7 | 1.3 |

| Example | 8 | Ref. 3 | 9 | 10 | 11 | 12 | 13 |
|---|---|---|---|---|---|---|---|
| PVP [mg/g] | 1.5 | 5.9 | 3.6 | 3.0 | 3.3 | 1.5 | 1.4 |

Examples 14-19

The hollow fiber membranes of Example 1a formed at a spinning speed of 20 m/min were washed under different conditions, in order to determine the best conditions for eliminating the greatest amount of PVP and NMP.

As a reference, the membrane was washed in one, two or three washings baths (wb), respectively. Then, the washing process was extended by using from one to three pressurized washing chambers (pc). The washing conditions are summarized in table 5. The same pressurized chambers as in Examples 2 to 13 have been used.

TABLE 5

Washing of hollow fiber membranes

| Example | wb 1 | wb 2 | wb 3 | pc 1 p [bar] | pc 2 p [bar] | pc 3 p [bar] |
|---|---|---|---|---|---|---|
| Ref. 4 | x | x | x | — | — | — |
| Ref. 5 | x | x | — | — | — | — |
| 14 | x | x | — | 1 | — | — |
| 15 | x | x | — | 1 | 1 | — |
| 16 | x | x | — | 1 | 1 | 1 |
| Ref. 6 | x | — | — | — | — | — |
| 17 | x | — | — | 1 | — | — |
| 18 | x | — | — | 1 | 1 | — |
| 19 | x | — | — | 1 | 1 | 1 |

The membranes obtained were then analyzed for their content of free PVP. The results are summarized in table 6.

TABLE 6

Free PVP content in dry fibers after washing

| Example | Ref. 4 | Ref. 5 | 14 | 15 | 16 | Ref. 6 | 17 | 18 | 19 |
|---|---|---|---|---|---|---|---|---|---|
| PVP [mg/g] | 1.9 | 2.7 | 2.3 | 1.7 | 1.7 | 4.9 | 2.7 | 2.0 | 2.8 |

Example 20-35

The hollow fiber membranes of Example 1b formed at a spinning speed of 45 m/min were washed under different conditions, in order to determine the best conditions for eliminating the greatest amount of PVP and NMP. The washing conditions are summarized in table 7.

Pressurized washing chambers similar to those used in Examples 2 to 19 were employed. The chambers were rectangular and connected to each other by a water bath through which the membrane traveled on the way from one chamber to the next. As a difference, the washing water inlet was not positioned vertically on the upper part of the pressurized chamber, but horizontally on one side of the chamber, orthogonal to the spinning direction of the hollow fiber membranes (FIG. 4). The washing water was heated up to 90° C. by heat exchangers connected to the pressurized washing chambers.

The membranes obtained were then analyzed for their content of free PVP. The results are summarized in table 8.

TABLE 7

Washing of hollow fiber membranes

| Example | wb 1 | wb 2 | wb 3 | pc 1 p [bar]/T [° C.] | pc 2 p [bar]/T [° C.] | pc 3 p [bar]/T [° C.] |
|---|---|---|---|---|---|---|
| Ref. 7 | x | x | x | — | — | — |
| Ref. 8 | x | x | — | — | — | — |
| 20 | x | x | — | 1.5/59 | — | — |
| 21 | x | x | — | 2.2/64 | — | — |
| 22 | x | x | — | 1.5/61 | 1.5/60 | — |
| 23 | x | x | — | 2.2/66 | 2.2/65 | — |
| 24 | x | x | — | 1.6/62 | 1.6/62 | 1.6/62 |
| 25 | x | x | — | 2.4/66 | 2.4/62 | 2.4/62 |
| 26 | x | x | — | 1.6/90 | — | — |
| 27 | x | x | — | 1.6/90 | 1.6/90 | — |
| 28 | x | x | — | 1.6/90 | 1.6/90 | 1.6/90 |
| Ref. 9 | x | — | — | — | — | — |
| 29 | x | — | — | 1.4/62 | — | — |
| 30 | x | — | — | 2.2/62 | — | — |
| 31 | x | — | — | 2.5/62 | — | — |
| 32 | | | | 1.5/62 | 1.5/62 | — |
| 33 | | | | 2.2/62 | 2.2/62 | — |
| 34 | | | | 1/62 | 1/62 | 1/62 |
| 35 | | | | 1.4/62 | 1.4/62 | 1.4/62 |

TABLE 8

Free PVP content in dry fibers after washing

| Example | Ref. 7 | Ref. 8 | 20 | 21 | 22 | 23 | 24 | 25 | 26 | 28 |
|---|---|---|---|---|---|---|---|---|---|---|
| PVP [mg/g fiber] | 2.5 | 3.8 | 2.6 | 1.6 | 1.7 | 1.6 | 1.8 | 1.6 | 1.8 | 1.7 |

| Example | 27 | Ref. 9 | 29 | 30 | 31 | 32 | 33 | 34 | 35 |
|---|---|---|---|---|---|---|---|---|---|
| PVP [mg/g fiber] | 1.4 | 6.7 | 3.6 | 1.9 | 1.7 | 2.5 | 1.3 | 3.6 | 2.2 |

Examples 36-53

Further experiments with pressurized washing chambers as in Examples 20-35 were carried out using the hollow fiber membranes of Example 1b formed at a spinning speed of 45 m/min. Instead of an overpressure, underpressure or a combination of underpressure and overpressure was applied. The washing conditions and the content of free PVP in the membranes are summarized in table 9.

TABLE 9

Washing of hollow fiber membranes

| Example | wb 1 | wb 2 | wb 3 | pc 1 p [bar] | pc 2 p [bar] | pc 3 p [bar] | PVP [mg/g] |
|---|---|---|---|---|---|---|---|
| Ref. 10 | x | x | x | — | — | — | 2.7 |
| Ref. 11 | x | x | — | — | — | — | 3.9 |
| 36 | x | x | — | 0.5 | — | — | 3.8 |
| 37 | x | x | — | 0.25 | — | — | 3.3 |
| 38 | x | x | — | 0.09 | — | — | 3.7 |
| 39 | x | x | — | 0.07 | 1.6 | — | 2.7 |
| 40 | x | x | — | 0.07 | 2.3 | — | 2.0 |
| 41 | x | x | — | 0.08 | 1.6 | 1.6 | 2.4 |
| 42 | x | x | — | 1.65 | 0.09 | 1.7 | 2.0 |
| 43 | x | x | — | 2.2 | 0.09 | 2.2 | 1.4 |
| Ref. 12 | x | — | — | — | — | — | 7.3 |
| 44 | x | — | — | 0.5 | — | — | 6.1 |
| 45 | x | — | — | 0.25 | — | — | 5.6 |
| 46 | x | — | — | 0.13 | — | — | 5.1 |
| 47 | x | — | — | 0.12 | 1.6 | — | 2.4 |
| 48 | x | — | — | 0.13 | 2.2 | — | 1.6 |
| 49 | x | — | — | 0.14 | 1.6 | 1.6 | 1.6 |
| 50 | x | — | — | 1.6 | 0.07 | 1.6 | 1.9 |
| 51 | x | — | — | 2.2 | 0.1 | 2.2 | 1.4 |
| 52 | x | — | — | 1.6 | 1.6 | 0.1 | 1.9 |
| 53 | x | — | — | 2.2 | 2.2 | 0.01 | 1.3 |

Examples 54-59

Hollow fiber membranes of Example 1b spun at 45 m/min were conducted through three washing baths, each washing bath comprising a godet which the membranes were guided around before advancing to the next washing bath.

In order to enhance the rinsing process of the hollow fiber membranes, a flat-jet nozzle was used to pressure-wash the membranes enlaced around the godet of the last washing bath.

Two different nozzles were used. The first one had a power of 2.5 l/min and a spraying angle of 60° (type 1), the second one a power of 0.6 l/min and a spraying angle of 30° (type 2). The flat-jet nozzles were combined with a gear pump (Ismatec BVP-Z, IDEX Health & Science GmbH, 97877 Wertheim-Mondfeld, Germany), resulting in a maximal water pressure of 2 bar at the first nozzle and of 3 bar at the second nozzle. The washing conditions and the results are summarized in table 10.

TABLE 10

Washing of hollow fiber membranes

| Example | wb 1 | wb 2 | wb 3 | nozzle nr | type | p [bar] | angle godet | distance [mm] | NMP [mg/g] |
|---|---|---|---|---|---|---|---|---|---|
| Ref. 13 | x | x | x | — | — | — | — | — | 9.7 |
| Ref. 14 | x | x | — | — | — | — | — | — | 58.6 |
| 54 | x | x | — | 1 | 1 | 2 | 45° | 40 | 35.8 |
| 55 | x | x | — | 1 | 1 | 2 | 90° | 40 | 48.8 |
| 56 | x | x | — | 1 | 2 | 3 | 90° | 40 | 46.8 |
| 57 | x | x | — | 1 | 2 | 3 | 90° | 20 | 8.7 |
| Ref. 15 | x | — | — | — | — | — | — | — | 172.7 |
| 58 | x | — | — | 3 | 2 | 2.9 | 90° | 10 | 26.2 |
| 59 | x | — | — | 1 | 2 | 3 | 90° | 10 | 81.7 |

Examples 60-63

In a further experiment a combination of pressurized washing chambers and ultrasound was applied. For this purpose, a first pressurized washing chamber was modified by mounting an ultrasonic device vertically on top of the chamber, while a second pressurized washing chamber was unmodified (FIG. 6). The sonotrode had a power of 1000 W, a frequency of 20 kHz and oscillation amplitude of 25 μm. The power can be varied between 50% and 100%. The oscillation amplitude can be varied by a booster which has a factor of 1.8 or 0.56. The experimental conditions and the results are summarized in table 11.

TABLE 11

Washing of hollow fiber membranes

| | | | | pc 1 + ultrasound | | | | |
|---|---|---|---|---|---|---|---|---|
| Example | wb 1 | wb 2 | wb 3 | p [bar] | T [° C.] | P [W] | d [mm] | booster factor |
| Ref. 16 | x | x | x | — | — | — | — | — |
| Ref. 17 | x | x | — | — | — | — | — | — |
| 60 | x | x | — | 0.5 | 41 | — | — | — |
| 61 | x | x | — | 0.5 | 56 | 156 | 2.5 | 1.8 |
| 62 | x | x | — | 2 | 39 | — | — | — |
| 63 | x | x | — | 2 | 56 | 285 | 9.5 | 1.8 |

| | pc 2 | | PVP |
|---|---|---|---|
| Example | p [bar] | T [° C.] | [mg/g] |
| Ref. 16 | — | — | 2.8 |
| Ref. 17 | — | — | 4.6 |
| 60 | 0.5 | 38 | 3.6 |
| 61 | 0.5 | 38 | 2.9 |
| 62 | 2 | 39 | 3.4 |
| 63 | 2 | 46 | 2.7 |

Examples 64-73

In a further experiment, the hollow fiber membranes of Example 1 were mechanically compressed to force fluid through the wall of the membranes. The hollow fiber membranes were guided over a pinching device, namely a roller bearing a groove smaller than the outer diameter of the membranes (FIG. 7). The roller was interchangeable with rollers having different groove widths. The compression of the hollow fiber membranes was, therefore, dependent on the groove width. The hollow fiber membrane of Example 1 having an outer diameter of 315 μm experienced, for example, a mechanical compression of 115 μm when guided over a roller having a groove of 200 μm width. At the same time, the hollow fiber membrane was rinsed with a jet of water at low pressure. The experimental conditions and results are summarized in table 12.

TABLE 12

Washing of hollow fiber membranes

| Example | wb 1 | wb 2 | wb 3 | roller groove [μm] | PVP [mg/g] | NMP [mg/g] |
|---|---|---|---|---|---|---|
| Ref. 18 | x | x | x | — | 2.6 | 8.1 |
| Ref. 19 | x | x | — | — | 4.0 | 14.2 |
| 64 | x | x | — | 200 | 3.5 | 16.3 |
| 65 | x | x | — | 150 | 3.4 | 17.1 |
| 66 | x | x | — | 100 | 2.6 | 16.9 |
| 67 | x | x | — | 50 | 2.7 | 16.2 |
| 68 | x | x | — | 0 | 2.2 | 15.7 |
| Ref. 3 | x | — | — | — | 5.8 | 56.8 |
| 69 | x | — | — | 200 | 6.1 | 89.7 |
| 70 | x | — | — | 150 | 5.9 | 86.7 |
| 71 | x | — | — | 100 | 2.9 | 43.1 |
| 72 | x | — | — | 50 | 3.0 | 51.6 |
| 73 | x | — | — | 0 | 3.0 | 55.1 |

The invention claimed is:

1. A process for removing residuals from hollow fiber membranes by enforced convective transport of a washing fluid through a membrane wall, said process comprising the step of
   bringing the hollow fiber membranes to a bath of the washing fluid prior to mechanically compressing the hollow fiber membranes,
   wherein the hollow fiber membranes are rinsed with the washing fluid during mechanical compression, and
   wherein the hollow fiber membranes are guided through a pinching device comprising a roller bearing a groove having a width smaller than the outer diameter of the membranes, and
   guiding the hollow fiber membranes over the roller bearing the groove having a width smaller than the outer diameter of the membranes, the hollow fiber membranes being passed through the groove.

2. A process according to claim 1, wherein the groove width of the roller is in the range of from 50 to 200 μm.

3. A process according to claim 2 wherein a vacuum is applied to the hollow fiber membranes to suck the washing fluid through the wall of the membranes.

4. A process according to claim 3 wherein the hollow fiber membranes are guided over a roller comprising radial slots, the slots being smaller in width than the outer diameter of the hollow fiber membranes, the roller further comprising a center chamber having an access to the slots, wherein by applying vacuum to the center chamber and to the slots, the hollow fiber membrane is sucked into the slots, and wherein by simultaneously pouring a washing fluid over the hollow fibers, the washing fluid is sucked from the outside through the membranes into the center chamber.

5. The process of claim 2 wherein the washing fluid is water.

6. A process according to claim 1 wherein a vacuum is applied to the hollow fiber membranes to suck the washing fluid through the wall of the membranes.

7. A process according to claim 6, wherein the hollow fiber membranes are guided over a roller comprising radial slots, the slots being smaller in width than the outer diameter of the hollow fiber membranes, the roller further comprising a center chamber having an access to the slots, wherein by applying vacuum to the center chamber and to the slots, the hollow fiber membrane is sucked into the slots, and wherein by simultaneously pouring a washing fluid over the hollow fibers, the washing fluid is sucked from the outside through the membranes into the center chamber.

8. The process of claim 7 wherein the washing fluid is water.

9. The process of claim 7 wherein the slots comprise at their narrowest point a depth and a width in the range of 0.2 mm to 1 mm.

10. The process of claim 7 wherein the slots comprise at their narrowest point a depth and a width in the range of 0.3 mm to 0.5 mm.

11. The process of claim 6 wherein the vacuum applied corresponds to a pressure in the range of from 0.2 to 1 bar.

12. The process of a claim 11, wherein the vacuum applied corresponds to a pressure in the range of from 0.4 to 0.8 bar.

13. The process of claim 6 wherein the washing fluid is water.

14. The process of claim 1 wherein the washing fluid is water.

15. The process of claim 14 wherein the water is present at a temperature in the range of 15° C. to 100° C.

16. The process of claim 14 wherein the water is present at a temperature in the range of 40° C. to 90° C.

17. The process of claim 1 wherein the hollow fiber membranes comprise one or more of polysulfone, polyethersulfone, and polyvinylpyrrolidone.

18. The process of claim 1 wherein the washing fluid is present at a temperature in the range of 15° C. to 100° C.

19. The process of claim 1 wherein the washing fluid is present at a temperature in the range of 40° C. to 90° C.

* * * * *